United States Patent [19]

Wentzel et al.

[11] 3,723,862
[45] Mar. 27, 1973

[54] DETECTOR FOR DETECTING OBJECTS MOVING THROUGH A MAGNETIC FIELD ESTABLISHED BETWEEN COILS OF AN L-C OSCILLATOR

[75] Inventors: Peter Wentzel; Edwald Schulze, both of Munich, Germany

[73] Assignee: Siemens Aktiengesellschaft, Berlin and Munich, Germany

[22] Filed: Apr. 5, 1971

[21] Appl. No.: 130,881

[30] Foreign Application Priority Data

Apr. 29, 1970 Germany..................P 20 21 102.3

[52] U.S. Cl. ......................324/41, 331/65, 340/282
[51] Int. Cl. ..............................................G01r 33/00
[58] Field of Search ..........324/41; 331/65; 340/282; 311/11

[56] References Cited

UNITED STATES PATENTS

| | | | |
|---|---|---|---|
| 2,505,577 | 4/1950 | Rich | 331/65 |
| 3,469,204 | 9/1969 | Magyar et al | 331/65 |
| 3,609,580 | 9/1971 | Thompson | 331/65 |

FOREIGN PATENTS OR APPLICATIONS 1,298,555  7/1969  Germany..............................331/65

Primary Examiner—Robert J. Corcoran
Attorney—Hill, Sherman, Meroni, Gross & Simpson

[57] ABSTRACT

A detector for detecting objects as they move through a magnetic field established between a transmitter coil connected to an electrical supply and a receiver coil spaced from and magnetically coupled to the transmitter coil. The receiver coil, together with a capacitor, form the oscillatory circuit of an amplifier to provide an oscillator which oscillates to provide a high amplitude output signal in response to alteration of the magnetic field due to an object passing therethrough. The oscillator is provided with three feedback networks including one feedback network which functions as a source of alternating current which causes the oscillator to provide the low amplitude output signal. The oscillatory circuit includes a resistor for providing a highly damped operation which supports the effect of the first mentioned feedback circuit. A second feedback circuit provides constant amplification and a third feedback circuit includes the transmitter and receiver coils for effecting the regenerative function for oscillation.

6 Claims, 3 Drawing Figures

Patented March 27, 1973  3,723,862
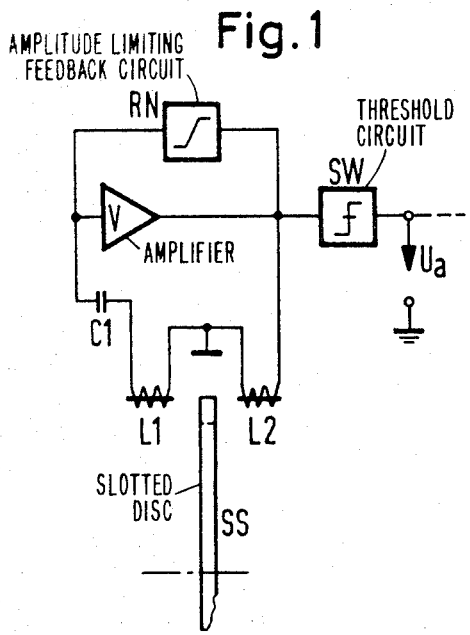
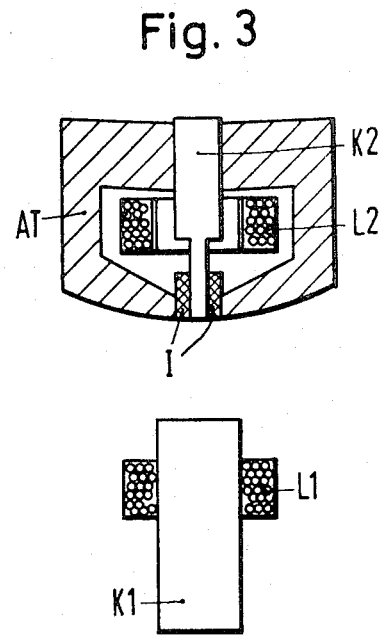
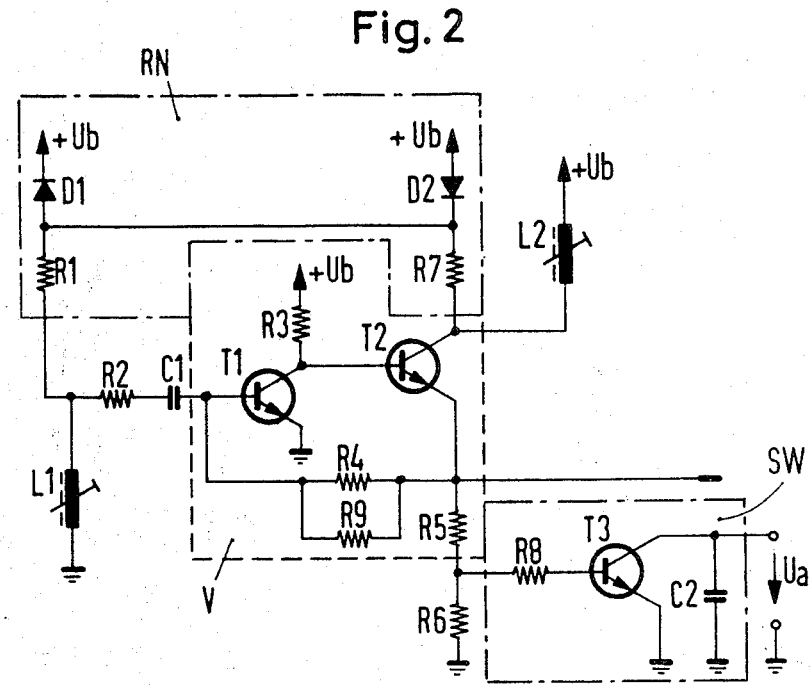
INVENTORS
Peter Wentzel
Ewald Schulze
ATTYS.

DETECTOR FOR DETECTING OBJECTS MOVING THROUGH A MAGNETIC FIELD ESTABLISHED BETWEEN COILS OF AN L-C OSCILLATOR

BACKGROUND OF THE INVENTION

1. Field of the Invention

This invention relates to apparatus for detecting moving objects, and in particular to an L–C oscillator for accurate detection of moving objects.

2. Description of the Prior Art

The prior art includes a detector for objects which when introduced into a magnetic field, change the magnetic field. A transmitter provides the source of the magnetic field and a receiver is coupled to the transmitter and spaced therefrom sufficiently to provide passage of objects to be registered therebetween without physical contact.

During the above process, the inductive coupling between the transmitter and the receiver is altered by passage therebetween of an object to be registered which causes a voltage change in the receiver. This voltage change can be sensed and directly or indirectly utilized in order to operate electric switches or the like. In order to be able to provide measurements which are as precise as possible, the object of German patent application P 15 74 563.8 is to improve the accuracy and reproducibility of the signals received from such detectors.

According to the above-identified application, the accuracy and reproducibility is improved through the provision of magnet cores for establishing the magnetic field, which cores are disposed in a magnetic field cabinet to provide fixed flux line concentration. The magnet cores are aligned and provided with relatively small frontal surfaces at the sides of the path of motion of the objects to be registered. A magnetic screening installation is provided for at least the transmitter or at least the receiver to shield the corresponding core except for its small front surface.

In response to the changing electric voltage in the receiver of such an arrangement, electric switches or the like may be operated as mentioned above. These signal emitters can comprise, for example, an L–C oscillator, the resonant circuit inductance of which is formed by the coil of either the transmitter or the receiver. Since generally an oscillator only starts to oscillate when a disturbance exists, the point in time of the initiation of oscillation of a conventional self-oscillating detector statistically varies according to the inherent noise of the circuit. These fluctuations impair the time accuracy of the detector.

SUMMARY OF THE INVENTION

It is therefore the primary object of the invention to further improve the time accuracy of a detector for movable objects with an L–C oscillator as a signal emitter, which oscillator has resonant circuit whose characteristics are altered when an object to be registered is guided past a receiver in a contactless manner. This technique is also applicable to the inductive detector disclosed in the aforementioned German patent application.

According to the invention, the above objective is realized through the provision of an alternating voltage source which is connected to the input of the oscillator in such a manner so that the oscillator operates in a state of rest (during absence of an object) to provide a low amplitude signal and upon detection of an object it immediately oscillates to provide a high amplitude signal. With this technique, the problem of statistical fluctuations at the point in time of oscillation initiation in the prior art apparatus is overcome and accordingly, the accuracy of the detector is not influenced. The advantages of the detector of the above prior art detector circuit improved in accordance with the present invention become truly evident.

A particularly advantageous further development of this invention resides in the provision of the alternating voltage source as an amplitude-dependent feedback network connected between the output and input of the oscillator circuit and parallel thereto an inverse feedback circuit to maintain the amplification of the oscillator constant. This technique obviates the necessity of an external alternating voltage source and the oscillator amplitude can be fixed to a specific value for one of the two oscillatory states at little expenditure. In addition, the additional inverse feedback circuit improves detector accuracy in that it renders the amplification of the oscillator substantially independent of the frequency.

BRIEF DESCRIPTION OF THE DRAWING

Other objects, features and advantages of the invention, its organization, construction and operation will be best understood from the following detailed description of an exemplary embodiment thereof taken in conjunction with the accompanying drawing, in which:

FIG. 1 is a schematic block diagram of a detector according to the invention;

FIG. 2 is a circuit diagram corresponding to the circuit of FIG. 1; and

FIG. 3 is a schematic representation of a transmitter and receiver for an inductive detector having coils which form a feedback network of the oscillator.

DESCRIPTION OF THE PREFERRED EMBODIMENT

The position of movable objects is to be registered by means of a detector. In the particular example illustrated in the drawing, a rotating slotted disk SS is schematically illustrated in FIG. 1 to represent such objects. The disk SS has radially extending slots distributed about its circumference, the front and back edges of the slots representing the leading and trailing edges of the objects being directed past a receiver element of the detector. The receiving element of the detector essentially comprises a receiver coil L1. This coil L1 and a further coil L2, which is designed as an emitting coil, together form a feedback network of an L-C oscillator. Both coils L1, L2 are inductively coupled with each other and the slotted disk SS rotating therebetween alters the coupling factor of the coils since the slotted disk SS has good electric conductance and strongly suppresses the coupling as long as no slot of the disk is traversing the area between the emitting coil L2 and the receiver coil L1.

The receiver coil L1 and a capacitor C1 which is connected between this coil and the input of an oscillator together form the oscillatory circuit of the oscillator. The oscillator is designed in such a manner that it only oscillates to provide a large amplitude oscillatory signal when a slot is located between the receiver coil L1 and the emitting or transmitting coil L2, but since such an oscillator only starts to oscillate when a disturbance occurs, the point of time of initiation of the oscillation fluctuates statistically in accordance with the self-noise of the circuit. These fluctuations would impair the time accuracy of the detector to an unacceptable degree. In order to avoid this situation, the oscillator is provided with a further feedback network RN which is constructed as an amplitude-limiting network. Therefore, it is provided that the oscillator oscillates continuously to provide a small amplitude oscillatory signal. A change of the voltage induced in the receiver coil L1 therefore only affects the amplitude of the oscillator delayed by the time constant involved in the initiation of oscillation.

Through the utilization of the above techniques, it now becomes evident that the oscillator has two oscillatory states according to whether or not a slot is just moving past the receiving element. These two states of oscillation are elevated by means of a threshold value circuit SW which is connected to the output of the oscillator, which threshold value circuit SW is energized in response to the larger amplitude signals to emit an output signal $U_a$.

The switching arrangement of the detector is illustrated in the circuit diagram of FIG. 2. The oscillatory circuit of the oscillator is formed by the receiver coil L1 and the capacitor C1 connected to the input of an amplifier V. A resistor R2 is connected between the receiver coil L1 and the capacitor C1 and is effective to suppress or damp the oscillations established in the coil L1 and the capacitor C1. With this circuit arrangement, the time constant for the initiation of oscillation of the oscillator can be kept to a small value; in addition, the quality of the coil L1 has only a small influence. Attention is invited that the oscillatory circuit L1, C1, R2 is operated with a 45° detuning in order to obtain a phase rotation of the signal which is fed back by way of the coils L2, L1. The amplifier V is constructed as a two-stage amplifier from a pair of transistors T1 and T2. In this particular case, the base of the first transistor T1 is connected with the oscillatory circuit capacitor C1, the emitter is grounded and the collector is connected to the positive supply voltage $+U_b$ by way of a collector resistor R3. The base of the second transistor T2 is connected to the collector of the first transistor T1, the emitter of the second transistor T2 is connected to ground by way of a voltage divider circuit including a pair of resistors R5 and R6, and the emitter is further connected to the base of the first transistor T1 by way of a resistor R4 which has a further resistor R9 connected in parallel therewith to serve as a compensating resistance. This last-mentioned circuit forms an inverse feedback network which is proportioned in such a manner that the amplification of the entire oscillator remains substantially constant.

The oscillator also comprises, according to the present invention, a feedback network RN. This network is realized through the provision of a resistor R7 and a resistor R1 which are connected to each other and respectively to the collector of the transistor T2 and to the junction of the coil L1 and the resistor R2 at the input or base circuit of the transistor T1. The network further includes a pair of parallel connected oppositely poled diodes D1, D2 which are connected between the resistors R1, R7 and the supply potential $+U_b$ to provide an amplitude-dependent feature for the network. By way of the proportioning of the feedback network RN, the alternating voltage connected to the limiter diodes D1, D2 is fed back over the resistor R1 and the oscillator circuit L1, R2, C1 in such a manner that the oscillator amplitude lies below the control resolution of the threshold value circuit SW. In addition to this, the oscillator includes a further feedback network which comprises the emitting coil L2 positioned in the transmitter of the detector and connected between the collector of the transistor T2 and the positive supply potential $+U_b$, and the receiver coil L1 which represents the oscillatory circuit inductance and which is positioned in the receiving element of the detector. The values of the emitter coil L2 and of the emitter resistor R7 of the second amplifier stage cause a certain phase rotation of the feedback signal which, together with the detuning of oscillatory circuit L1, C1, R2, is sufficient to meet the phase requirement at the input of the amplifier V.

The physical arrangement of the emitting coil L2 and the receiver coil L1 is evident from FIG. 3 which schematically illustrates the emitting and receiving elements of an inductive detector. The emitter element includes the emitting coil L2 which has a magnetic core K2 and which is surrounded by a magnetic screening pot AT. On the surface opposite to the receiving element, the magnetic core K2 of the emitting coil L2 and its screening pot AT are insulated from one another through the provision of small insulating plates I. This construction of the emitter according to the theory of the aforementioned patent application renders a strong concentration of the magnetic field between the emitting coil L2 and the receiving coil L1 coupled thereto. The receiving coil L1 has a magnetic core K1 associated therewith. If, as in the selected illustrative example, a rotating slotted disk SS is moved between the emitter and the receiver, the strongly concentrated magnetic field is changed thereby. A slot guided between the emitter and the receiver does not influence the magnetic field and the coupling between the two coils L1 and L2 is increased during this process. In the receiver coil L1, a higher voltage is induced which is sufficient to enable the oscillator to operate with a sufficient amplitude to overcome the threshold of the threshold circuit SW in response to the passage of areas between the slots of the disk SS.

The threshold circuit SW comprises a further transistor T3 which is operated in an emitter-base circuit configuration and has a base resistor R8 connected to the junction point of the resistors R5, R6 of the emitter voltage divider associated with the transistor T2. In the state of rest of the oscillator, i.e. as long as it oscillates with a small amplitude, a direct voltage and a small superimposed alternating current are provided from the voltage divider network to the base of the transistor T3, which signals are ineffective to operate the transistor T3; the transistor T3 remains securely blocked. In contrast to this, if the oscillator oscillates with sufficient amplitude, the alternating voltage at the resistor R6 is superimposed upon the direct current potential at the resistor R6 so that the transistor T3 is periodically energized. In this case, the threshold value circuit SW emits a large output signal Ua which is screened through a smoothing capacitor C2 connected between the emitter and collector of the transistor T3, the emitter and the capacitor C2 being grounded.

Although the instant invention has been described above by means of a particular exemplary embodiment thereof, it is not limited to this particular embodiment. Preferably, the invention is to be utilized for inductive detectors which are constructed according to the principles set forth in the above-identified German application for patent, but this is nevertheless a limitation on the invention. The invention is generally advantageous when utilized in the case of detectors for movable objects, if high accuracy of the position of the object to be registered is of importance. In this case, such an object cannot only be detected through the variable coupling between two coils; the oscillatory circuit characteristics could be changed, for example, by damping to a stronger extent from a high amplitude signal to a low amplitude signal in response to object detection, and also object detection may be determined by a change of capacitance of the oscillatory circuit.

Many other changes, modifications and alterations may be made of the invention by one skilled in the art without departing from the spirit and scope of the invention, and it is to be understood that we intend to include within the patent warranted hereon all such changes, modifications and alterations which may reasonably and properly be included within the scope of our contribution to the art.

What we claim is:

1. Apparatus for detecting objects as they move through a magnetic field, comprising: an L–C oscillator having an input and an output a transmitter coil connected to an electrical supply and to the output of said oscillator to produce a magnetic field; a receiver coil spaced from and magnetically coupled to said transmitter coil, said objects passing through the space between said coils to alter the magnetic coupling therebetween; said oscillator input connected to said receiver coil, said receiving coil constituting the inductance of the oscillator L–C circuit, said oscillator providing an output signal of a first amplitude in response to alteration of the magnetic coupling between said coils, said oscillator including first and second transistors each having a base, an emitter and a collector, the collector of said first transistor connected to the base of said second transistor, said base of said first transistor serving as said input of said oscillator and the collector-emitter circuit of said second transistor serving as the output of said oscillator; an alternating voltage source connected to said oscillator causing said oscillator to produce an output signal of a second amplitude when said magnetic coupling between said coils is unaltered, said alternating voltage source including an amplitude-dependent feedback circuit comprising a first resistor connected to the base of said first transistor, a second resistor connected between said first resistor and the collector of said second transistor and a pair of oppositely poled parallel connected diodes connected between the junction of said first and second resistors and the electrical supply for limiting the amplitude of the feedback signal; and a reverse feedback network including a third resistor connected between said emitter of said second transistor and the base of said first transistor for maintaining constant amplification for the amplifier portion of said oscillator.

2. Apparatus according to claim 1, comprising a further feedback network which includes said transmitter coil connected between the electrical supply and the collector of said second transistor, and said receiver coil connected between the base of said first transistor and a reference potential.

3. Apparatus according to claim 2, comprising a capacitor connected in circuit with said receiver coil to form the L–C oscillating circuit of said oscillator, and a fourth resistor connected in circuit with said oscillatory circuit to provide strong damping of the oscillations thereof.

4. The apparatus according to claim 1, comprising a threshold circuit connected to the output of said oscillator and operable to provide an amplitude indicative signal in response to an output signal of said first amplitude.

5. The apparatus according to claim 4, comprising a voltage divider circuit connected between the emitter of said second transistor and a reference potential, and said threshold circuit comprises a third transistor having a base, an emitter and a collector, a fourth resistor connected between said voltage divider and the base of said third transistor, and a smoothing capacitor connected between the collector and emitter of said third transistor.

6. Apparatus for detecting objects as they move through a magnetic field, comprising: an L–C oscillator capable of operating to provide an output signal of one amplitude and of another amplitude, said oscillator having an input, an output, and an oscillatory circuit including a capacitor connected to said input and a first coil connected to said capacitor, a feedback circuit also including said first coil and a second coil connected to an electrical supply and to the output of said oscillator, said coils spaced apart and magnetically coupled, the magnetic coupling being altered by an object passing between said coils causing said oscillator to oscillate to provide said output signal at said one magnitude, an AC amplitude-dependent feedback circuit connected between the output and the input of said oscillator to cause said oscillator to oscillate to provide said output signal at said other amplitude in the absence of alteration of the magnetic coupling between said coils, and a reverse feedback circuit connected between said output and said input of said oscillator for maintaining a constant amplification of said oscillator, said oscillatory circuit including a resistor connected to said capacitor and to said first coil for strong damping of oscillations.

* * * * *